(12) United States Patent
Moreno Muñoz et al.

(10) Patent No.: US 9,847,737 B2
(45) Date of Patent: Dec. 19, 2017

(54) MODULAR MULTILEVEL CONVERTER LEG WITH FLAT-TOP PWM MODULATION, CONVERTER AND HYBRID CONVERTER TOPOLOGIES

(71) Applicant: General Electric Technology GmbH, Baden (CH)

(72) Inventors: Francisco Jose Moreno Muñoz, Stafford (GB); Omar Fadhel Jasim, Nottingham (GB); Si Dang, Staffordshire (GB); Sajjad Fekriasl, Staffordshire (GB); Kevin Dyke, Staffordshire (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/107,435

(22) PCT Filed: Dec. 17, 2014

(86) PCT No.: PCT/EP2014/078339
§ 371 (c)(1),
(2) Date: Jun. 22, 2016

(87) PCT Pub. No.: WO2015/097048
PCT Pub. Date: Jul. 2, 2015

(65) Prior Publication Data
US 2017/0005589 A1    Jan. 5, 2017

(30) Foreign Application Priority Data
Dec. 23, 2013 (EP) .................................. 13275334

(51) Int. Cl.
*H02M 7/483* (2007.01)
*H02M 7/5395* (2006.01)
(Continued)

(52) U.S. Cl.
CPC ......... *H02M 7/483* (2013.01); *H02M 7/5395* (2013.01); *H02M 7/217* (2013.01);
(Continued)

(58) Field of Classification Search
CPC ............ H02M 7/04; H02M 7/12; H02M 7/14; H02M 7/143; H02M 7/146; H02M 7/537;
(Continued)

(56) References Cited

U.S. PATENT DOCUMENTS

| | | |
|---|---|---|
| 5,047,913 A | 9/1991 | De Doncker et al. |
| 5,923,546 A | 7/1999 | Shimada et al. |

(Continued)

FOREIGN PATENT DOCUMENTS

| | | |
|---|---|---|
| CN | 102195508 A | 9/2011 |
| CN | 102332809 A | 1/2012 |

(Continued)

OTHER PUBLICATIONS

Buja, G.S. et al., "Optimal Pulsewidth Modulation for Feeding AC Motors," IEEE Transactions on Industry Applications, vol. IA-13, Issue 1, pp. 38-44 (1977).
(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A voltage source converter for interconnecting first and second electrical networks, including first and second terminals for connection to the first electrical network, and a primary converter limb extending between the first and second terminals including first and second primary limb portions separated by a third terminal connectable to the second electrical network. The converter further including a second chain-link converter connected to the third terminal
(Continued)

and a control unit configured to selectively operate one or more chain-link modules to generate a discontinuous pulse width modulation voltage waveform. The converter further including a controller configured to selectively operate each chain-link converter to control the configuration of a discontinuous pulse width modulation voltage waveform at the third terminal. The controller including the control unit, and configured to selectively control switching of each primary limb portion into the circuit between the third terminal and one of the first and second terminals.

6 Claims, 10 Drawing Sheets

(51) Int. Cl.
  *H02M 7/219*  (2006.01)
  *H02M 7/493*  (2007.01)
  *H02M 7/217*  (2006.01)
  *H02M 1/00*  (2006.01)

(52) U.S. Cl.
  CPC ............ *H02M 7/219* (2013.01); *H02M 7/493* (2013.01); *H02M 2001/0058* (2013.01); *H02M 2007/4835* (2013.01); *Y02B 70/1491* (2013.01)

(58) Field of Classification Search
  CPC .. H02M 7/5387; H02M 7/5388; H02M 7/539; H02M 7/5395; H02M 2007/4835; H02M 1/32; H02M 2001/0058; H02M 2001/322; H02M 2001/325; H02M 7/15; H02M 7/217; H02M 7/219; H02M 7/42; H02M 7/44; H02M 7/48; H02M 7/483; H02M 7/49; H02M 7/493; H02M 7/757; H02M 7/7575; H02M 7/797; Y02B 70/1491; H02J 3/36
  See application file for complete search history.

(56) References Cited

U.S. PATENT DOCUMENTS

| | | | |
|---|---|---|---|
| 8,599,591 B2 | 12/2013 | Crookes et al. | |
| 2012/0069610 A1 | 3/2012 | Trainer et al. | |
| 2012/0120691 A1 | 5/2012 | Armschat et al. | |
| 2012/0127766 A1* | 5/2012 | Crookes ................ | H02J 3/1857 363/126 |
| 2012/0195084 A1* | 8/2012 | Norrga ................ | H02M 7/483 363/127 |
| 2013/0128629 A1 | 5/2013 | Clare et al. | |
| 2013/0208514 A1 | 8/2013 | Trainer et al. | |
| 2014/0293668 A1 | 10/2014 | Trainer | |
| 2014/0362479 A1 | 12/2014 | Park et al. | |
| 2015/0295507 A1 | 10/2015 | Barupati et al. | |
| 2015/0349520 A1 | 12/2015 | Davidson et al. | |
| 2015/0357931 A1 | 12/2015 | Oates et al. | |
| 2015/0357941 A1 | 12/2015 | Oates et al. | |
| 2016/0105109 A1 | 4/2016 | Jasim et al. | |
| 2016/0141876 A1 | 5/2016 | Oates et al. | |
| 2016/0248341 A1 | 8/2016 | Trainer et al. | |

FOREIGN PATENT DOCUMENTS

| | | | |
|---|---|---|---|
| CN | 102460933 A | | 5/2012 |
| EP | 2 755 315 A1 | | 7/2014 |
| EP | 2 755 317 A1 | | 7/2014 |
| EP | 2 773 006 A1 | | 9/2014 |
| EP | 2 797 216 A1 | | 10/2014 |
| GB | 1 483 201 A | | 8/1977 |
| GB | 2 516 068 A | | 1/2015 |
| JP | 2001-238484 A | | 8/2001 |
| JP | 2007-259688 A | | 10/2007 |
| JP | 2009-022094 A | | 1/2009 |
| WO | 02063758 A1 | | 8/2002 |
| WO | WO-2010/088969 A1 | | 8/2010 |
| WO | WO-2011/015227 A1 | | 2/2011 |
| WO | WO 2011/050847 A1 | | 5/2011 |
| WO | WO-2011/050847 A1 | | 5/2011 |
| WO | WO-2011/098117 A1 | | 8/2011 |
| WO | WO-2011/124258 A1 | | 10/2011 |
| WO | WO-2011/127980 A1 | | 10/2011 |
| WO | WO-2012/003857 A1 | | 1/2012 |
| WO | WO-2012/013248 A1 | | 2/2012 |
| WO | WO-2012/025142 A1 | | 3/2012 |
| WO | WO 2012/163841 A1 | | 12/2012 |
| WO | WO-2013/000510 A1 | | 1/2013 |
| WO | WO-2014/108225 A1 | | 7/2014 |
| WO | WO-2014/108257 A1 | | 7/2014 |
| WO | WO-2014/108258 A1 | | 7/2014 |
| WO | WO-2014/131476 A1 | | 9/2014 |
| WO | WO-2014/173606 A1 | | 10/2014 |

OTHER PUBLICATIONS

Davidson, C.C. et al., "Innovative Concepts for Hybrid Multi-Level Converters for HVDC Power Transmission", International Conference on AC and DC Power Transmission, pp. 1-5 (Oct. 19, 2010).
Feldman et al., "A Hybrid Modular Multilevel Voltage Source Converter for HVDC Power Transmission," IEEE Transaction on Industry Application, vol. 49, No. 4, 12 pages (Jul. 1, 2013).
Feldman et al., "A Hybrid Voltage Source Converter Arrangement for HVDC Power Transmission and Reactive Power Compensation," 5th IET International Conference on Power Electronics, Machines and Drives (PEMD 2010), 6 pages (Apr. 19, 2010).
Hava, A., et al., "High Performance Generalized Discontinuous PWM Algorithm," IEEE Transactions on Industry Applications, vol. 34, No. 5, pp. 1059-1071 (Sep./Oct. 1998).
International Search Report and Written Opinion, PCT/EP2013/075845, 13 pages dated Feb. 11, 2015.
Lesnicar, A., et al., An Innovative Modular Multilevel Converter Topology Suitable for a Wide Power Range,: Proceeding of IEEE Power Technology Conference, 6 pages (2003).
Oates, C., "Optimal PWM on a Microcomputer," IEE International Conference on Variable Speed Drives, London, England (1984).
Patel H.S. et al., "Generalised Techniques of Harmonic Elimination and Voltage Control in Thyristor Inverters: Part 1 013 Harmonic Elimination," IEEE Transactions on Industry Applications, vol. IA-9, Issue 3, pp. 310-317 (1973).
Patel, H.S. et al., "Generalised Techniques of Harmonic Elimination and Voltage Control in Thyristor Inverters: Part 2 013 Voltage Control Techniques," IEEE Transactions on Industry Applications, vol. IA-10, Issue 5, pp. 666-673 (1974).
Sebasthi, Rani K. et al., "Multilevel Shunt Active Filter based on Sinusoidal Subtraction Methods Under Different Load Conditions," Computational Technologies in Electrical and Electronics Engineering (Suburcon), pp. 629-697, ISBN: 978-1-4244-7625-1 (2010).
Trainer, D.R. et al., "B4-111 A new Hybrid Voltage-Sourced Converter for HVDC Power Transmission," Cigre Session 2010, Cigre, Paris, France, pp. 1-12, XP008134692 (Aug. 23, 2010).
International Search Report and Written Opinion, PCT/EP2013/075842, 13 pages dated Jan. 20, 2015.
International Search Report and Written Opinion, PCT/EP2014/078339, Alstom Technology Ltd, 12 pages dated Mar. 20, 2015.
Picas, R., et al., "Improving capacitor voltage ripples and power losses of modular multilevel converters through discontinuous modulation," 39th Annual Conference on the IEEE Industrial Electronics Society, pp. 6233-6238 (Nov. 10, 2013).
Kolar, J.W., et al., "Influence of the modulation method on the conduction and switching losses of a PWM converter system," Conference Record of the Industry Applications Society Annual Meeting, 25, pp. 502-512 (Oct. 7-12, 1990).
Depenbrock, M., "Pulse width control of a 3-phase inverter with non-sinusoidal phase voltages," International Semiconductor Power Converter Conference, pp. 399-403 (Jan. 1, 1977).
Trainer, D.R., et al., "B4-111: A new hybrid voltage-sourced converter for HVDC power transmission," CIGRE Session 2010, pp. 1-12 (Aug. 23, 2010).

(56) References Cited

OTHER PUBLICATIONS

Unofficial English Translation of Chinese Office Action issued in connection with Related CN Application No. 201380074511.1 dated Apr. 5, 2017.
Unofficial English Translation of Chinese Office Action issued in connection with Related CN Application No. 201380074531.9 dated Mar. 17, 2017.
U.S. Final Office Action issued in connection with Related U.S. Appl. No. 14/760,450 dated Jul. 14, 2017.

* cited by examiner

MODULAR MULTILEVEL CONVERTER LEG WITH FLAT-TOP PWM MODULATION, CONVERTER AND HYBRID CONVERTER TOPOLOGIES

CROSS-REFERENCE TO RELATED APPLICATIONS

The present application is a National Stage of International Application No. PCT/EP2014/078339, filed Dec. 17, 2014, which claims the benefit of and priority to European Application No. 13275334, filed Dec. 23, 2013, which is incorporated herein by reference in its entirety.

This invention relates to a voltage source converter including a chain-link converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies.

In any such power transmission network, converters are required at each interface between AC and DC power to effect the required conversion, and one such form of converter is a voltage source converter (VSC).

It is known in voltage source converters to use six-switch (two-level) and three-level converter topologies 10,12 with insulated gate bipolar transistors (IGBT) 14, as shown in FIGS. 1a and 1b. The IGBT devices 14 are connected and switched together in series to enable high power ratings of 10's to 100's of MW to be realized. In addition, the IGBT devices 14 switch on and off several times at high voltage over each cycle of the AC supply frequency to control the harmonic currents being fed to the AC electrical network. This leads to high losses, high levels of electromagnetic interference and a complex design.

It is also known in voltage source converters to use a multi-level converter arrangement such as that shown in FIG. 1c. The multi-level converter arrangement includes respective converter bridges 16 of cells 18 connected in series. Each converter cell 18 includes a pair of series-connected insulated gate bipolar transistors (IGBTs) 20 connected in parallel with a capacitor 22. The individual converter cells 18 are not switched simultaneously and the converter voltage steps are comparatively small. The capacitor 22 of each converter cell 18 is configured to have a sufficiently high capacitive value in order to constrain the voltage variation at the capacitor terminals in such a multi-level converter arrangement, and a high number of converter cells 18 are required due to the limited voltage ratings of the IGBTs 20. A reactor 24 is also required in each converter bridge 16 to limit transient current flow between converter limbs 26, and thereby enable the parallel connection and operation of the converter limbs 26. These factors lead to expensive, large and heavy equipment that has significant amounts of stored energy, which makes pre-assembly, testing and transportation of the equipment difficult.

There is provided a chain-link converter comprising a plurality of chain-link modules, each of the plurality of chain-link modules being operable to selectively provide a voltage source, wherein the chain-link converter includes a control unit configured to selectively operate the plurality of chain-link modules to generate a discontinuous pulse width modulation (dPWM) voltage waveform.

The dPWM voltage waveform, as generated by the plurality of chain-link modules, is a voltage waveform that is generated by the plurality of chain-link modules using pulse width modulation and includes an unmodulated period during which the plurality of chain-link modules is not actively operated.

The provision of the control unit in the chain-link converter enables the chain-link converter to generate a dPWM voltage waveform, thus resulting in a low total harmonic distortion (THD) in a corresponding current waveform. A low THD of the corresponding current waveform removes the need for costly and bulky filtering equipment to meet grid code requirements. This not only reduces the overall cost, size and footprint of the chain-link converter, but also eliminates the occurrence of power losses resulting from operation of the filtering equipment, thus improving the efficiency of the chain-link converter. Moreover the need for a dedicated and sophisticated control system for controlling such filtering equipment is obviated, thus simplifying the overall control of the chain-link converter.

In addition the presence of the unmodulated period in the dPWM voltage waveform generated by the chain-link converter decreases the period of active operation of the chain-link converter, thus reducing losses resulting from such active operation.

The control unit may be configured to selectively operate the plurality of chain-link modules to add a phase shift to a zero sequence component of the dPWM voltage waveform and thereby decrease or remove a phase difference between:
  a peak current which arises during generation of the dPWM voltage waveform; and
  an unmodulated period of the dPWM voltage waveform.

The magnitude of the phase shift may be computed from active and reactive power demands.

The ability to add a phase shift to a zero sequence component of the dPWM voltage waveform enables optimisation of the dPWM voltage waveform to modify the losses to resulting from active operation of the plurality of chain-link modules to comply with specific requirements of the associated power application.

Decreasing or removing the phase difference between a peak current which arises during generation of the dPWM voltage waveform and an unmodulated period of the dPWM voltage waveform allows the peak current to be more closely or exactly aligned with the unmodulated period in which the plurality of chain-link modules is not actively operated. This thereby reduces or eliminates losses that would have otherwise resulted from active operation of the plurality of chain-link modules near or at the peak current, thus reducing the overall losses resulting from active operation of the plurality of chain-link modules. In comparison to a current waveform corresponding to a dPWM voltage waveform without the additional phase shift, the THD of the current waveform corresponding to the dPWM voltage waveform with the additional phase shift is higher but remains low in absolute terms.

The unmodulated period of the dPWM voltage waveform may vary depending on the desired characteristics of the generated dPWM voltage waveform to meet specific requirements of the associated power application. For example, an unmodulated period of the dPWM voltage waveform may be less than, greater than or equal to 60 electrical degrees.

The configuration of each chain-link module may vary to meet specific requirements of the associated power application. For example, each of the plurality of chain-link modules may include at least one switching element and at least one energy storage device, the or each switching element and the or each energy storage device in each chain-link module combining to selectively provide a voltage source.

There is provided a voltage source converter, for interconnecting first and second electrical networks, comprising at least one chain-link converter, wherein the or each chain-link converter is in accordance with any preceding description of the chain-link converter.

As a result of the ability of the or each chain-link converter to generate a dPWM voltage waveform so as to result in a low THD in the corresponding current waveform, the provision of the or each chain-link converter in the voltage source converter enables the voltage source converter to not only transfer high quality power between the first and second electrical networks, but also reduce the required period of active operation of the voltage source converter components in order to transfer such high quality power, thus reducing the overall losses associated with voltage source conversion.

A transformer may be used to connect the voltage source converter to an AC electrical network. The transformer may be configured to be capable of removing the zero sequence component from the dPWM voltage waveform before it is presented to the AC electrical network (for example, the transformer may be configured as a star-delta transformer). This thereby reduces the AC filtering requirements of the voltage source converter.

The configuration of the voltage source converter may vary depending on the requirements of the associated power application.

According to an aspect of the invention, there is provided a voltage source converter, for interconnecting first and second electrical networks, comprising:
  first and second terminals for connection to the first electrical network; and
  a primary converter limb extending between the first and second terminals, the primary converter limb including first and second primary limb portions separated by a third terminal, the third terminal being connectable to the second electrical network, each primary limb portion including at least one switching element and/or a first chain-link converter, each primary limb portion being operable to be switched into and out of circuit between the third terminal and a respective one of the first and second terminals, each primary limb portion being operable to transfer power between the third terminal and a respective one of the first and second terminals;
  at least one second chain-link converter connected to the third terminal, the or each chain-link converter comprising a plurality of chain-link modules, each of the plurality of chain-link modules being operable to selectively provide a voltage source, wherein the or each chain-link converter includes a control unit configured to selectively operate the plurality of chain-link modules to generate a discontinuous pulse width modulation voltage waveform; and
  a controller configured to selectively operate the or each chain-link converter to control the configuration of a dPWM voltage waveform at the third terminal, the controller including the or each control unit, the controller being configured to selectively control switching of each primary limb portion into circuit between the third terminal and a respective one of the first and second terminals during a respective unmodulated period of the discontinuous pulse width modulation voltage waveform, the controller being configured to selectively coordinate operation of the primary limb portions and the or each second chain-link converter to control the configuration of the discontinuous pulse width modulation voltage waveform at the third terminal.

The voltage source converter according to the invention may be a multi-phase voltage source converter. In embodiments of the invention in which the voltage source converter is connectable to a multi-phase AC electrical network, the voltage source converter may include a plurality of primary converter limbs, the third terminal of each primary converter limb being connectable to a respective phase of a multi-phase AC electrical network.

The or each control unit may be an integral part of the controller. When the controller includes a plurality of control units, the or each control unit may be discrete from the or each other control unit.

In use, the primary limb portions may be used to provide a primary current path for the transfer of power between the first and second electrical networks while the or each second chain-link converter, by way of its control of the configuration of the dPWM voltage waveform at the third terminal, supports the switching of each primary limb portion into and out of circuit between the third terminal and a respective one of the first and second terminals.

The control of the configuration of the dPWM voltage waveform at the third terminal in this manner provides control over the voltage experienced by each primary limb portion and thereby reduces the risk of damage caused by voltage levels exceeding the voltage ratings of the primary limb portions. As such it is more straightforward to design and optimise the voltage source converter because the primary limb portions can be configured without having to consider the possibility of voltage levels exceeding the voltage ratings of the primary limb portions.

When each primary limb portion includes at least one naturally commutated switching element (e.g. a thyristor), large snubbing circuitry is normally required to control the rate of change of voltage across each naturally commutated switching element after it has been commutated off. Also, large reactors are required to accommodate the long recovery time between the turn-off and turn-on of each naturally commutated switching element. The inclusion of the or each second chain-link converter in the voltage source converter according to the invention however permits fine control of the rate of change of voltage across each naturally commutated switching element and the recovery time between the turn-off and turn-on of each naturally commutated switching element, thus reducing or eliminating the need to include the snubbing circuitry and reactors.

Configuration of the voltage source converter according to the invention to include at least one second chain-link converter enables reduction of the overall losses incurred during transfer of power between the first and second electrical networks.

Firstly, during the operation of the voltage source converter according to the invention, power is divided between the primary converter limb and the or each second chain-link converter over each power cycle. By using switching elements with low conduction losses in the primary limb portions, the overall conduction losses in the voltage source converter according to the invention can be reduced in comparison to a conventional voltage source converter having the same number of converter limbs, each converter limb including a plurality of chain-link modules, an example of which is shown in FIG. 1c. This provides further savings in terms of the cost, size and footprint of the voltage source converter according to the invention.

Secondly, operation of the voltage source converter including at least one second chain-link converter obviates the need for the or each second chain-link converter to be in constant active operation during the transfer of power between the first and second electrical networks.

Although generation of the dPWM voltage waveform at the third terminal can result in additional losses due to a reduced conduction time of the primary limb portions when compared to generation of another type of voltage waveform (such as a trapezoidal voltage waveform) at the third terminal, the dPWM voltage waveform may be shaped to have an average voltage level that is lower than that of the other type of voltage waveform in order to compensate for the above losses resulting from the reduced conduction time of the primary limb portions.

In embodiments of the invention employing the use of at least one second chain-link converter, each primary limb portion may be operable to switch the or each second chain-link converter into and out of circuit with a respective one of the first and second terminals. In such embodiments, the or each second chain-link converter may be connected between the third terminal and ground, and/or may be connected between the third terminal and a fourth terminal that is connected between the first and second terminals.

In other embodiments of the invention employing the use of at least one second chain-link converter, the voltage source converter may include a secondary converter limb connected in parallel with the primary converter limb between the first and second terminals. The secondary converter limb may include first and second secondary limb portions separated by a junction. Each secondary limb portion may include a second chain-link converter. The voltage source converter may further include a connection interconnecting the third terminal and the junction to form a star configuration in which a first branch of the star configuration includes the connection, a second branch of the star configuration includes the first secondary limb portion, a third branch of the star configuration includes the second secondary limb portion and the junction defines a mid-point of the star configuration.

When such a voltage source converter includes a plurality of primary converter limbs, the voltage source converter may include a corresponding number of secondary converter limbs, each of which is connected in parallel with a respective one of the primary converter limbs between the first and second terminals.

In still other embodiments of the invention employing the use of at least one second chain-link converter, the voltage source converter may include first and second secondary limb portions. Each secondary limb portion may include a second chain-link converter. Each of the first and second secondary limb portions may be connected in parallel with a respective one of the first and second primary limb portions. The first primary limb portion and the third terminal may be separated by a first primary inductor. The second primary limb portion and the third terminal may be separated by a second primary inductor. The first secondary limb portion may further include a first secondary inductor. The second secondary limb portion further include a second secondary inductor.

When such a voltage source converter includes a plurality of primary converter limbs, the voltage source converter may include a corresponding number of first secondary limb portions, each of which is connected in parallel with a respective one of the first primary limb portions, and a corresponding number of second secondary limb portions, each of which is connected in parallel with a respective one of the second primary limb portions.

The inductance value of the first primary inductor may be higher or lower than the inductance value of the first secondary inductor. The inductance value of the second primary inductor may be higher or lower than the inductance value of the second secondary inductor.

The configuration of the voltage source converter in this manner results in an inductor arrangement that minimises or removes power glitches caused by generation of the dPWM voltage waveform at the third terminal, thus enabling smoother transfer of power between the first and second electrical networks.

In further embodiments of the invention, the controller may be configured to operate the or each second chain-link converter to control the rate of change of voltage at the third terminal when both primary limb portions are each switched out of circuit between the third terminal and a respective one of the first and second terminals.

The provision of the or each second chain-link converter in the voltage source converter according to the invention permits fine control over the rate of change of voltage at the third terminal to prevent the voltage from ramping too quickly between different voltage levels, thereby minimising or avoiding the occurrence of fast fronted and high voltage spikes that may otherwise damage or degrade components or their insulation.

In embodiments of the invention, the or each control unit may be configured to selectively operate the plurality of chain-link modules to add a phase shift to a zero sequence component of the discontinuous pulse width modulation voltage waveform and thereby decrease or remove a phase difference between:

a peak current which arises during generation of the discontinuous pulse width modulation voltage waveform; and
an unmodulated period of the discontinuous pulse width modulation voltage waveform.

In further embodiments of the invention, an unmodulated period of the discontinuous pulse width modulation voltage waveform may be less than, greater than or equal to 60 electrical degrees.

In still further embodiments of the invention, each of the plurality of chain-link modules may include at least one switching element and at least one energy storage device, the or each switching element and the or each energy storage device in each chain-link module combining to selectively provide a voltage source.

Each energy storage device may be any device that is capable of storing or releasing energy, e.g. a capacitor or battery.

Each chain-link module may be a unidirectional voltage source that can provide zero or non-zero voltage, and preferably can conduct current in two directions, i.e. each chain-link module may be a 2-quadrant unipolar chain-link module. For example, each chain-link module may include a pair of switching elements connected in parallel with an energy storage device in a half-bridge arrangement to define a 2-quadrant unipolar chain-link module that can provide zero or positive voltage and can conduct current in two directions.

Each chain-link module may be a bidirectional voltage source that can provide negative, zero or positive voltage, and preferably can conduct current in two directions, i.e. each module may be a 4-quadrant bipolar chain-link module. For example, each chain-link module may include two pairs of switching elements connected in parallel with an energy storage device in a full-bridge arrangement to define a 4-quadrant bipolar chain-link module that can provide negative, zero or positive voltage and can conduct current in two directions.

The or each chain-link converter may include a combination of 2-quadrant unipolar chain-link modules and 4-quadrant bipolar chain-link modules.

The modular arrangement of the or each chain-link converter according to the invention means that it is straightforward to increase or decrease the number of chain-link modules in the or each chain-link converter to achieve a desired power and/or voltage rating.

Each switching element may be a self-commutated switching element such as, for example, an insulated gate bipolar transistor, a gate turn-off thyristor, a field effect transistor, an injection-enhanced gate transistor or an integrated gate commutated thyristor.

Each switching element may be a naturally commutated switching element such as, for example, a thyristor or a diode. The use of at least one naturally-commutated switching device in each primary limb portion not only improves the robustness of the primary limb portions, but also makes the primary limb portions capable of withstanding surge currents that might occur due to faults in the electrical network(s). In such embodiments employing the use of naturally commutated switching elements as the switching elements, each chain-link module of the or each second chain-link converter is preferably a 4-quadrant bipolar chain-link module which can be switched to block the aforementioned surge currents.

It will be understood that, for embodiments in which either or both of the primary limb portions includes at least one switching element, the controller can control the switching of the or each switching element of the corresponding primary limb portion either by sending a turn-on or turn-off control signal to the or each switching element or by operating the or each chain-link converter to control the configuration of the voltage waveform at the third terminal to selectively cause switching of the or each switching element, depending on the type of switching element used.

The configuration of the voltage source converter according to the invention permits simplification of the design and construction of the primary limb portions without adversely affecting the performance of the voltage source converter according to the invention. For example, each primary limb portion may include a single switching element or a plurality of switching elements connected in series between the third terminal and a respective one of the first and second terminals. Switching elements with high voltage ratings can be selected for use in the primary limb portions to further reduce the footprint of the voltage source converter and thereby minimise the real estate costs of the associated power station.

There is provided a method of operating a chain-link converter comprising a plurality of chain-link modules, each of the plurality of chain-link modules being operable to selectively provide a voltage source, the method comprising the steps of operating the plurality of chain-link modules to generate a dPWM voltage waveform.

It will be appreciated that the use of the terms "first", "second", "primary" and "secondary" to describe features of the invention is merely intended to help distinguish between similar features (e.g. the first and second primary limb portions), and is not intended to indicate the relative importance of one feature over another feature.

It will be further appreciated that the chain-link converter is not limited to use in a voltage source converter and may be used as a stand-alone device or in other apparatus.

Preferred embodiments of the invention will now be desired, by way of non-limiting examples, with reference to the accompanying drawings in which.

Figure 2:
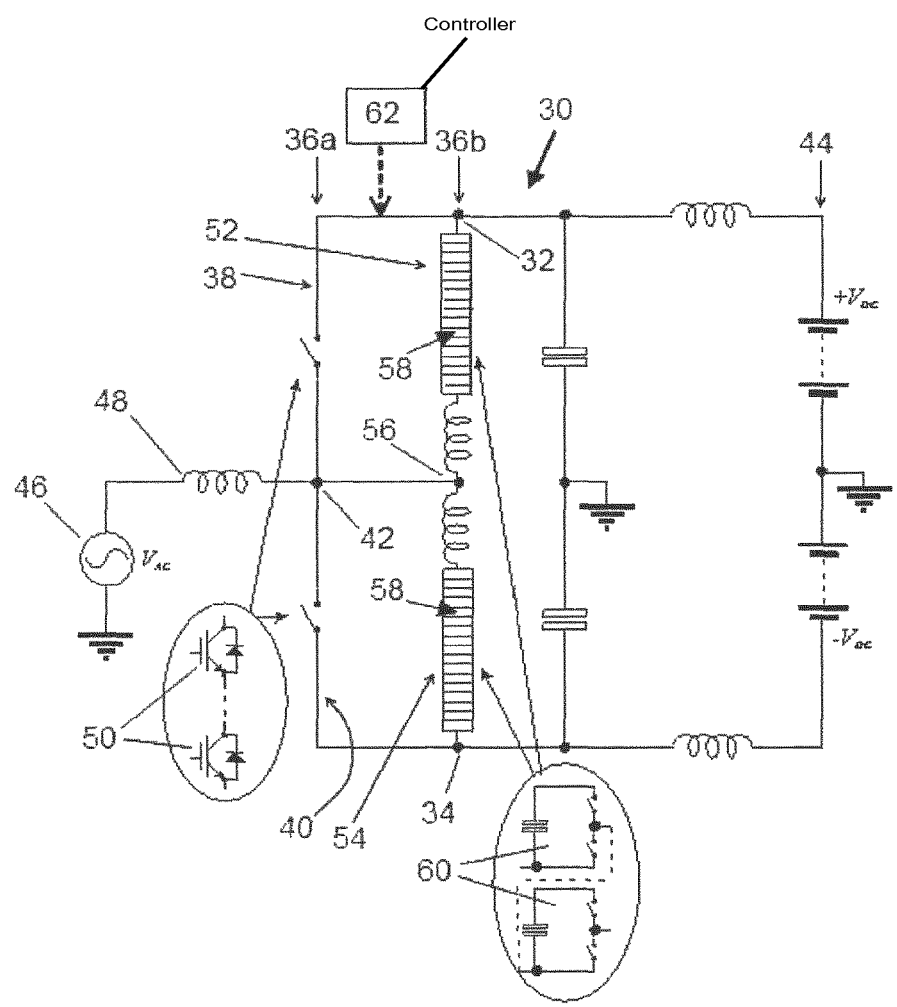
FIG. 2 shows, in schematic form, a voltage source converter according to a first embodiment of the invention.
Figure 5:
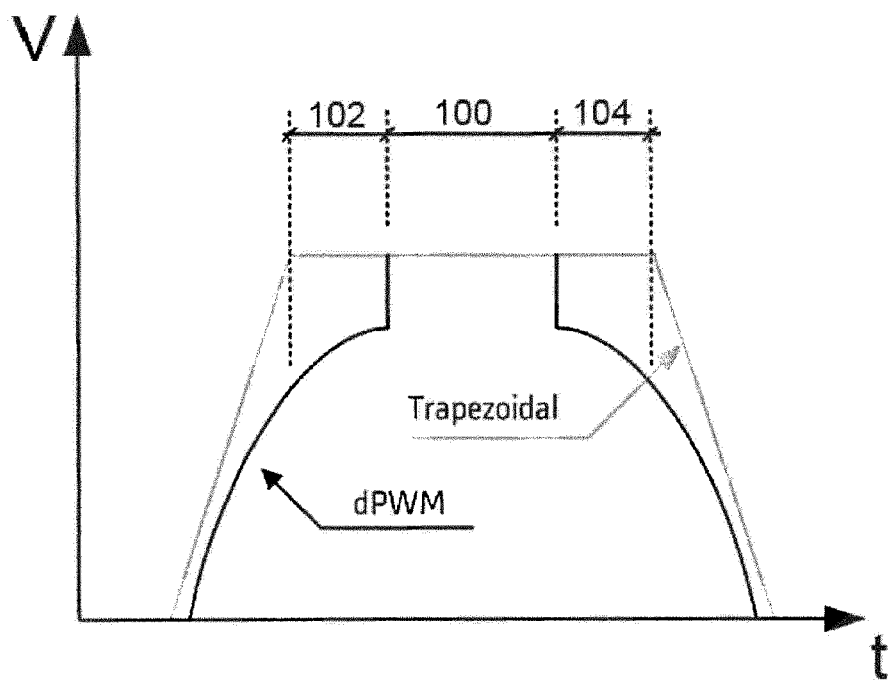
Figure 6:
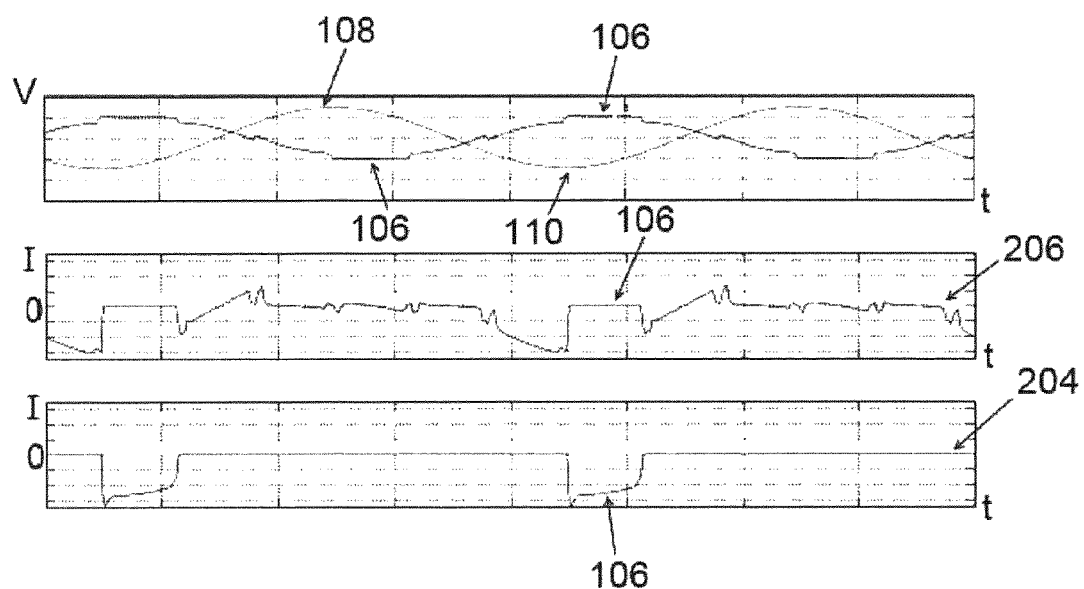
Figure 7:
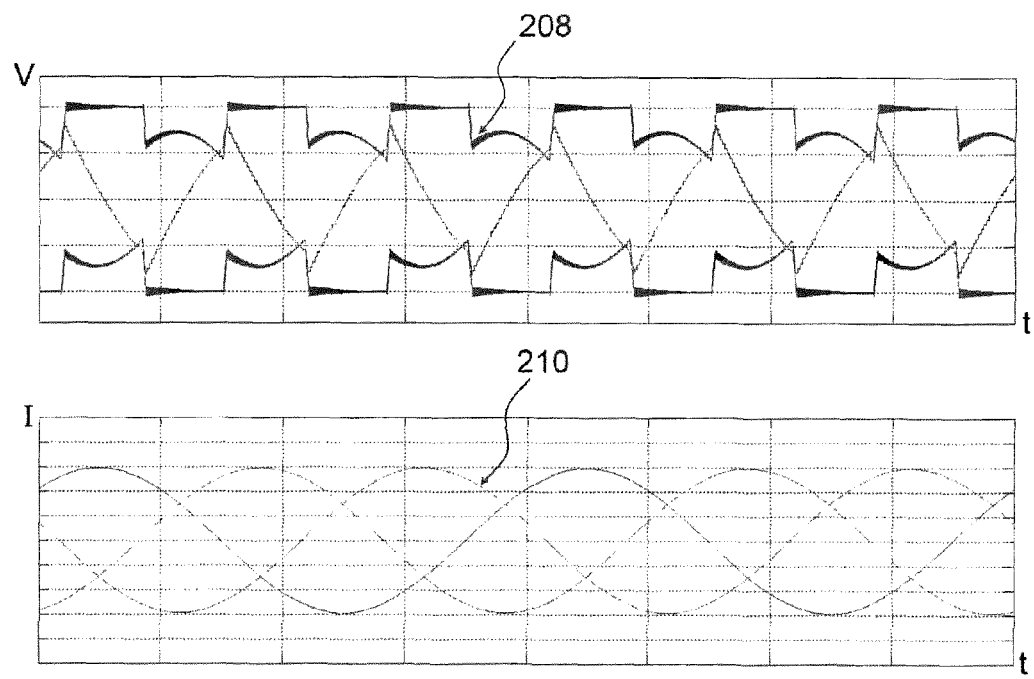
Figure 8:
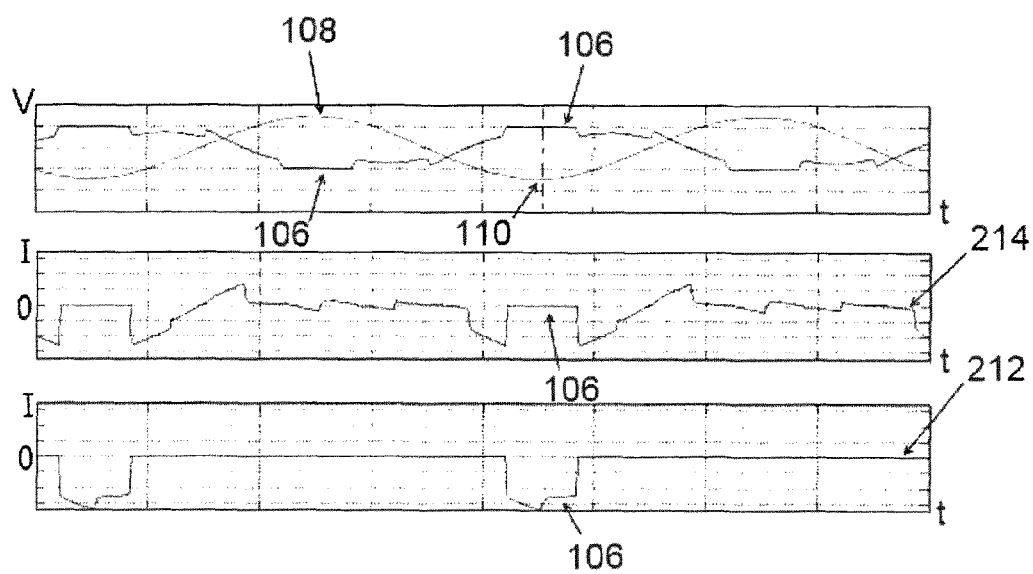
Figure 9:
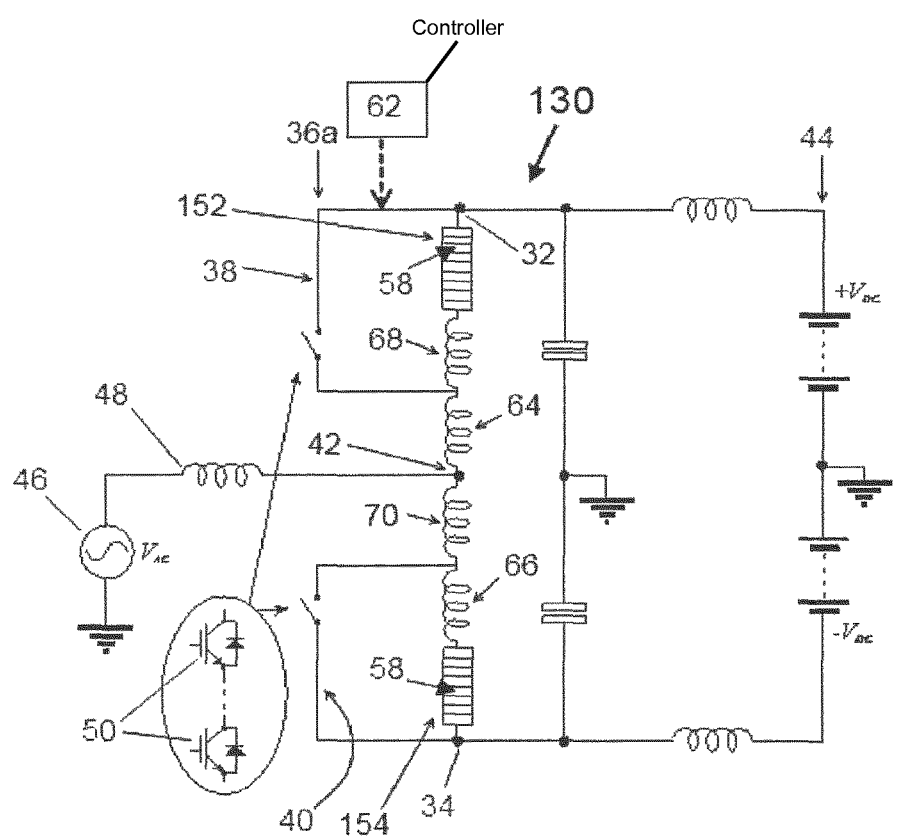
Figure 10:
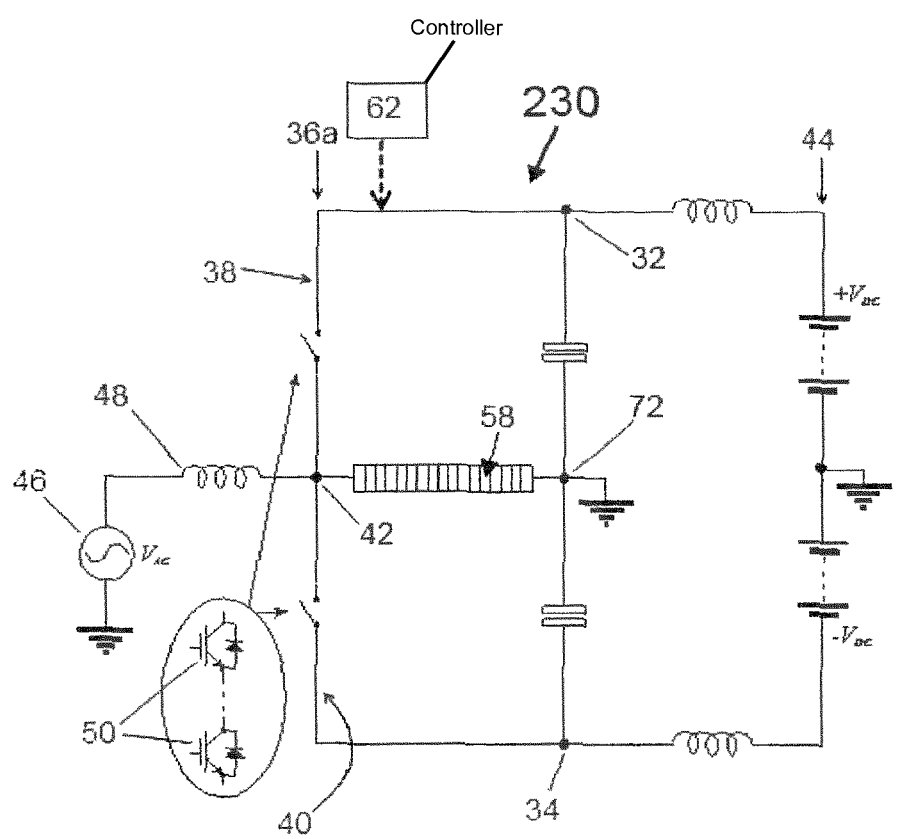
Figure 11:
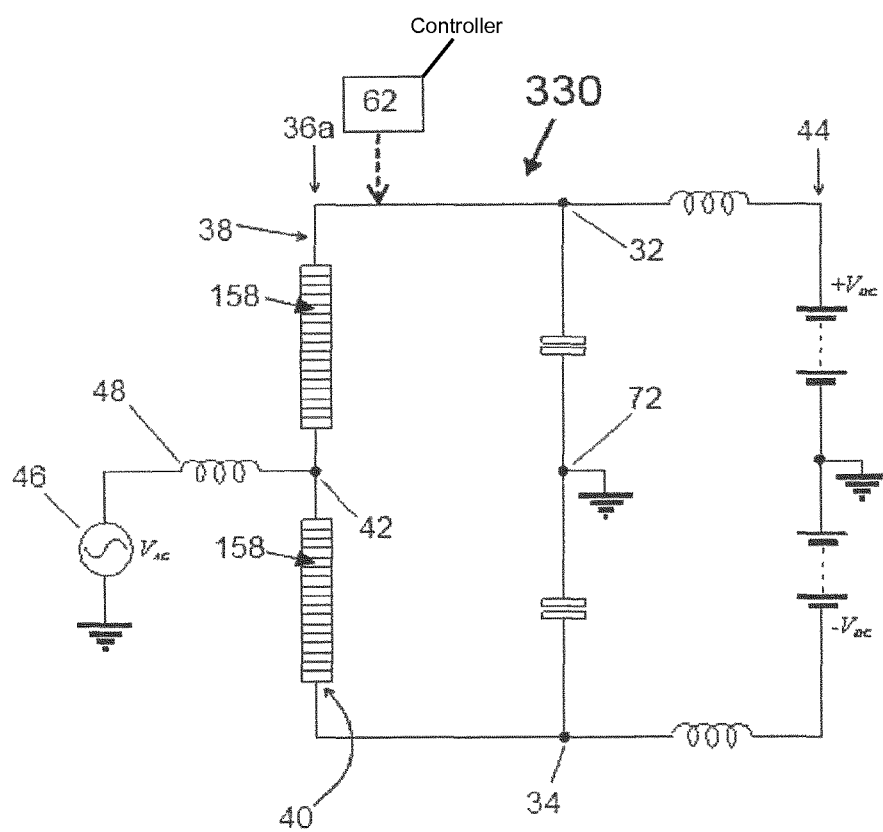

FIG. 5 compares, in graph form, a positive portion of the dPWM voltage waveform generated by the voltage source converter of FIG. 2 against a trapezoidal voltage waveform;

FIG. 6 illustrates, in graph form, current waveforms respectively flowing in the first primary and secondary limb portions of the voltage source converter of FIG. 2 during its operation to generate a dPWM voltage waveform;

FIG. 7 illustrates, in graph form, output AC voltage and current waveforms of the voltage source converter of FIG. 2 during its operation to generate a dPWM voltage waveform that includes an additional phase shift;

FIG. 8 illustrates, in graph form, current waveforms respectively flowing in the first primary and secondary limb portions of the voltage source converter of FIG. 2 during its operation to generate a dPWM voltage waveform that includes an additional phase shift;

FIG. 9 shows, in schematic form, a voltage source converter according to a second embodiment of the invention;

FIG. 10 shows, in schematic form, a voltage source converter according to a third embodiment of the invention; and FIG. 11 shows, in schematic form, a voltage source converter.

A first voltage source converter 30 according to a first embodiment of the invention is shown in FIG. 2.

The first voltage source converter 30 comprises first and second DC terminals 32,34, a plurality of primary converter limbs 36a and a plurality of secondary converter limbs 36b. For the purposes of simplicity, FIG. 2 only shows one of the plurality of primary converter limbs 36a and one of the secondary converter limbs 36b, but it will be understood that each of the other primary converter limbs 36a is identical in structure to the primary converter limb 36a shown in FIG. 2 and each of the other secondary converter limbs 36b is identical in structure to the secondary converter limb 36b shown in FIG. 2.

Each of the primary and secondary converter limbs 36a, 36b extends between the first and second DC terminals 32,34. Each of the plurality of secondary converter limbs 36b is connected in parallel with a respective one of the plurality of primary converter limbs 36a between the first and second DC terminals 32,34.

Each primary converter limb 36a includes first and second primary limb portions 38,40 separated by a third terminal 42. In the embodiment shown, the first primary limb portion 38 is connected between the first DC terminal 32 and the third terminal 42, and the second primary limb portion 40 is connected between the second DC terminal 34 and the third terminal 42.

In use, the first and second DC terminals 32,34 are respectively connected to positive and negative terminals of a DC electrical network 44, the positive and negative terminals of the DC electrical network 44 carrying voltages of +Vdc and −Vdc respectively, and the third terminal 42 of each primary converter limb 36a is connected to a respective phase of a multi-phase AC electrical network 46 via a phase reactance 48 and a star-delta transformer (not shown). The delta section of the star-delta transformer defines a transformer secondary that is connected to the first voltage source converter 30, while the star section of the star-delta transformer defines a transformer primary that is connected to the AC electrical network 46. Alternatively, in other embodiments of the invention, the star section of the star-delta transformer may define a transformer secondary that is connected to the first voltage source converter 30, while the delta section of the star-delta transformer may define a transformer primary that is connected to the AC electrical network 46

It is envisaged that, in other embodiments of the invention, the first voltage source converter may have a single converter limb or a different plurality of converter limbs to match the number of phases of an AC electrical network to which the first voltage source converter is connected.

Each primary limb portion 38,40 includes a director switch, which includes a plurality of series-connected switching elements 50. Each switching element 50 is in the form of an insulated gate bipolar transistor (IGBT) which is connected in parallel with an anti-parallel diode. It is envisaged that, in other embodiments of the invention, each IGBT may be replaced by a gate turn-off thyristor, a field effect transistor, an injection-enhanced gate transistor, an integrated gate commutated thyristor or any other self-commutated semiconductor device.

It is further envisaged that, in other embodiments of the invention, each plurality of series-connected switching elements may be replaced by a single switching element.

The configuration of the primary limb portions 38,40 in this manner means that, in use, each switching element 50 of each primary limb portion 38,40 is switchable to switch the corresponding primary limb portion 38,40 into and out of circuit between the third terminal 42 and the respective DC terminal 32,34.

Each secondary converter limb 36b includes first and second secondary limb portions 52,54 separated by a junction 56. In the embodiment shown, the first secondary limb portion 52 is connected between the first DC terminal 32 and the junction 56, and the second secondary limb portion 54 is connected between the second DC terminal 34 and the junction 56.

Each secondary limb portion 52,54 includes a second chain-link converter 58. Each second chain-link converter 58 includes a plurality of series-connected chain-link modules 60. Each chain-link module 60 includes a pair of switching elements and an energy storage device in the form of a capacitor. In each chain-link module 60, the switching elements are connected in parallel with the capacitor in a half-bridge arrangement to define a 2-quadrant unipolar chain-link module 60 that can provide zero or positive voltage and can conduct current in two directions.

It is envisaged that, in other embodiments of the invention, each chain-link module may be a bidirectional voltage source that can provide negative, zero or positive voltage. Such a chain-link module preferably can conduct current in two directions, i.e. each module may be a 4-quadrant bipolar chain-link module. For example, each chain-link module may include two pairs of switching elements connected in parallel with an energy storage device in a full-bridge arrangement to define a 4-quadrant bipolar chain-link module that can provide negative, zero or positive voltage and can conduct current in two directions.

It is envisaged that, in still other embodiments of the invention, each chain-link converter may include a combination of 2-quadrant unipolar chain-link modules and 4-quadrant bipolar chain-link modules.

Each switching element of each chain-link module 60 is constituted by a semiconductor device in the form of an Insulated Gate Bipolar Transistor (IGBT) which is connected in parallel with an anti-parallel diode. It is envisaged that, in other embodiments of the invention, each switching element of each chain-link module may be a different switching device such as a gate turn-off thyristor, a field effect transistor, an injection-enhanced gate transistor, an integrated gate commutated thyristor or any other self-commutated semiconductor device.

It is envisaged that, in other embodiments of the invention, the capacitor may be replaced by another energy storage device that is capable of storing or releasing energy, e.g. a battery.

The capacitor of each chain-link module 60 is selectively bypassed or inserted into the corresponding second chain-link converter 58 by changing the state of the switching elements. This selectively directs current through the capacitor or causes current to bypass the capacitor, so that each chain-link module 60 provides a zero or positive voltage.

The capacitor of each chain-link module 60 is bypassed when the pair of switching elements in each chain-link module 60 is configured to form a short circuit in the chain-link module 60, whereby the short-circuit bypasses the capacitor. This causes current in the second chain-link converter 58 to pass through the short circuit and bypass the capacitor, and so the chain-link module 60 provides a zero voltage, i.e. the chain-link module 60 is configured in a bypassed mode.

The capacitor of each chain-link module 60 is inserted into the second chain-link converter 58 when the pair of switching elements in each chain-link module 60 is configured to allow the current in the second chain-link converter 58 to flow into and out of the capacitor. The capacitor then charges or discharges its stored energy so as to provide a positive voltage, i.e. the chain-link module 60 is configured in a non-bypassed mode.

It is possible to build up a combined voltage across each second chain-link converter 58, which is higher than the voltage available from each of its individual chain-link modules 60, via the insertion of the capacitors of multiple chain-link modules 60, each providing its own voltage, into each second chain-link converter 58.

Each first secondary limb portion 52 includes an inductor connected in series with its second chain-link converter 58, and each second secondary limb portion 54 includes an inductor connected in series with its second chain-link converter 58.

The first voltage source converter 30 further includes a connection interconnecting the third terminal 42 and the junction 56 to form a star configuration in which a first branch of the star configuration includes the connection, a second branch of the star configuration includes the first secondary limb portion 52, a third branch of the star configuration includes the second secondary limb portion 54 and the junction 56 defines a mid-point of the star configuration. The connection interconnecting the third terminal 42 and the junction 56 allows the second chain-link converters 58 to be operated to control the configuration of an AC voltage waveform at the third terminal 42.

The first voltage source converter 30 further includes a controller 62 to control the switching of the director switches in the primary limb portions 38,40 and the switching elements in each chain-link module 60 of each second chain-link converter 58.

Each second chain-link converter 58 includes a control unit (not shown). Each control unit is an integral part of the controller 62, and is configured to control the switching of the switching elements in each chain-link module 60 of the corresponding second chain-link converter 58. It is envisaged that, in other embodiments of the invention, each control unit may be discrete from each other control unit.

Operation of the first voltage source converter 30 of FIG. 2 is described as follows, with reference to FIGS. 3 to 8.

For the purposes of this specification, the operation of the first voltage source converter 30 is primarily described with reference to one of its plurality of primary converter limbs 36a and one of its plurality of secondary converter limbs 36b. It will be appreciated that the described operation of one of the plurality of primary converter limbs 36a and one of the plurality of secondary converter limbs 36b of the first voltage source converter 30 applies mutatis mutandis to the operation of each of the other primary and secondary converter limbs 36a,36b.

In order to transfer power between the AC and DC electrical networks 46,44, the controller 62 controls the director switches to switch the primary limb portions 38,40 into and out of circuit between the respective DC terminal 32,34 and the third terminal 42 to provide a current path between the AC and DC electrical networks 46,44.

For the purposes of describing how the first voltage source converter 30 works, it is assumed that the starting point of the operation of the first voltage source converter 30 is the point at which the controller 62 turns on the director switch of the second primary limb portion 40 and thereby switches the second primary limb portion 40 into circuit between the second DC terminal 34 and the third terminal 42. It will be appreciated that the starting point of the operation of the first voltage source converter 30 can differ depending on the requirements of the power application associated with the first voltage source converter 30.

When the second primary limb portion 40 is switched into circuit between the second DC terminal 34 and the third terminal 42, the director switch in the second primary limb portion 40 is closed while the director switch in the first primary limb portion 38 is open. Current is prevented from flowing into the first primary limb portion 38 as a result of the anti-parallel diodes of the first primary limb portion 38 being reverse-biased. The switching of the second primary limb portion 40 into circuit between the second DC terminal 34 and the third terminal 42 provides a current path that connects the second DC terminal 34 to the third terminal 42 and thereby results in a voltage of $-V_{DC}$ being presented at the third terminal 42. At this stage the second chain-link converters 58 are not actively operated to control the configuration of the voltage at the third terminal 42 but are configured to track a near-zero or zero voltage reference, with a near-zero or zero current flowing through each second chain-link converter 58.

After a certain period of time, the controller 62 turns off the director switch of the second primary limb portion 40. At the same time the controller 62 controls the switching of the switching elements in each chain-link module 60 of the second chain-link converters 58 to present a negative voltage at the third terminal 42 which is now disconnected from the second DC terminal 34 as a result of the director switch of the second primary limb portion 40 being turned off and the anti-parallel diodes of the second primary limb portion 40 being reverse-biased. At this stage the negative voltage presented at the third terminal 42 has a lower magnitude than $-V_{DC}$.

Figure 3:
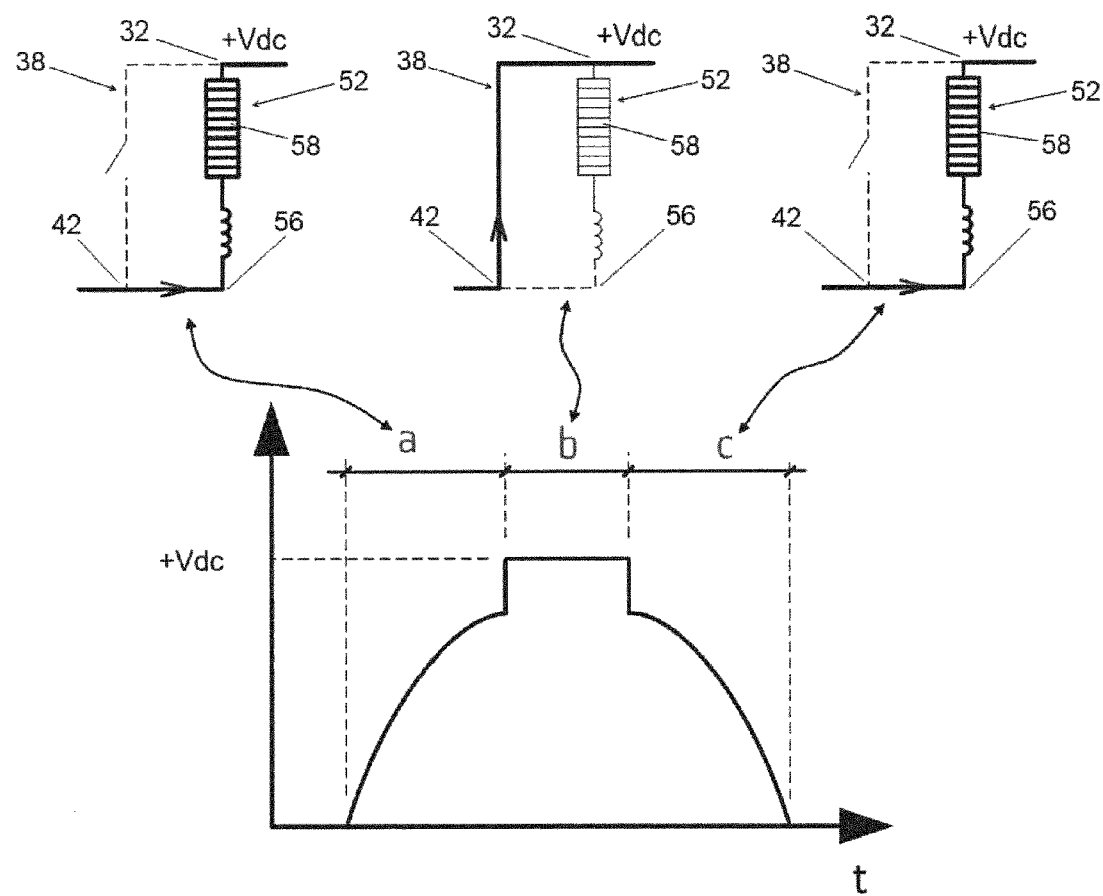
FIG. 3 illustrates, in schematic and graph form, the operation of the voltage source converter of FIG. 2 to generate a dPWM voltage waveform.

The controller 62 then controls the switching of the switching elements in each chain-link module 60 of the second chain-link converters 58 to ramp the voltage at the third terminal 42 in a positive direction (as indicated by "a" in FIG. 3). The anti-parallel diodes of the first and second primary limb portions 38,40 remain reverse-biased throughout the ramping process, which means that there is zero current flow in the first and second primary limb portions 38,40.

When the voltage at the third terminal 42 reaches a specific positive voltage after a certain period of time, the controller 62 turns on the director switch of the first primary limb portion 38 and thereby switches the first primary limb portion 38 into circuit between the first DC terminal 32 and the third terminal 42 (as indicated by "b" in FIG. 3). Current is prevented from flowing into the second primary limb portion 40 as a result of the anti-parallel diodes of the second primary limb portion 40 being reverse-biased. The switching of the first primary limb portion 38 into circuit between the first DC terminal 32 and the third terminal 42 provides a current path that connects the first DC terminal 32 to the third terminal 42 and thereby results in a voltage of $+V_{DC}$ being presented at the third terminal 42. At this stage the second chain-link converters 58 are not actively operated to control the configuration of the voltage at the third terminal 42 but are configured to track a near-zero or zero voltage reference, with a near-zero or zero current flowing through each second chain-link converter 58.

After a certain period of time, the controller 62 turns off the director switch of the first primary limb portion 38 and controls the switching of the switching elements in each chain-link module 60 of the second chain-link converters 58 to present a positive voltage at the third terminal 42 which is now disconnected from the first DC terminal 32 as a result of the director switch of the first primary limb portion 38 being turned off and the anti-parallel diodes of the first primary limb portion 38 being reverse-biased. At this stage the positive voltage presented at the third terminal 42 has a lower magnitude than $+V_{DC}$.

The controller 62 then controls the switching of the switching elements in each chain-link module 60 of the second chain-link converters 58 to ramp the voltage at the third terminal 42 in a negative direction (as indicated by "c" in FIG. 3) until the voltage at the third terminal 42 reaches a specific negative voltage after a certain period of time. Thereafter, the controller 62 turns on the director switch of the second primary limb portion 40 to switch the second primary limb portion 40 back into circuit between the second DC terminal 34 and the third terminal 42.

Switching the first and second primary limb portions 38,40 in and out of circuit between the third terminal 42 and the respective DC terminal 32,34 allows the voltage at the third terminal 42 to commutate between $+V_{DC}$ and $-V_{DC}$, thereby generating an AC voltage waveform at the third terminal 42.

Figure 4:
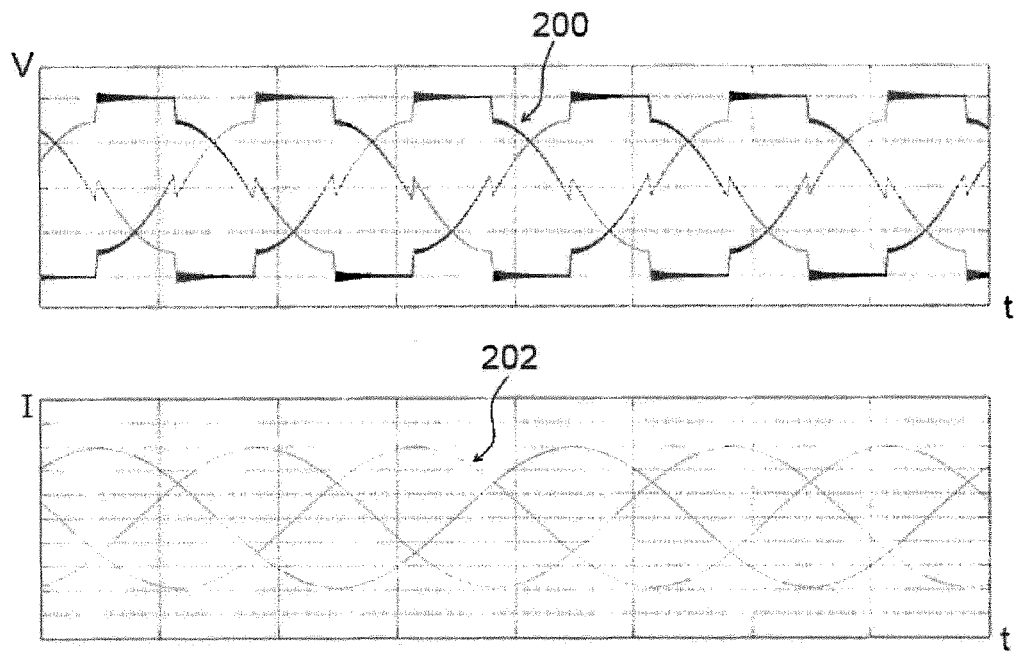
FIG. 4 illustrates, in graph form, output AC voltage and current waveforms of the voltage source converter of FIG. 2 during its operation to generate a dPWM voltage waveform.

The AC voltage waveform generated at the third terminal 42 is shaped to be in the form of a dPWM voltage waveform 200, as shown in FIG. 4. More particularly, the controller 62 selectively coordinates switching of the switching elements of the primary limb portions 38,40 and the second chain-link converters 58 to control the configuration of the AC voltage waveform to be in the form of a dPWM voltage waveform that is a combination of a zero sequence component and a sinusoidal voltage waveform. The resultant alternating current waveform 202 at the third terminal 30 is sinusoidal, as shown in FIG. 4.

During generation of the dPWM voltage waveform at the third terminal 42, switching of each director switch into circuit between the third terminal 42 and the respective DC terminal 32,34 occurs during a respective unmodulated period of the dPWM voltage waveform at the third terminal 42, whereby each unmodulated period corresponds to a period in which the second chain-link converters 58 are not actively operated to control the configuration of the voltage at the third terminal 42 but are configured to track a near-zero or zero voltage reference, with a near-zero or zero current flowing through each second chain-link converter 58.

In the embodiment shown, each unmodulated period of the dPWM voltage waveform is equal to 60 electrical degrees, but may be less than or greater than 60 electrical degrees vary in other embodiments depending on the specific requirements of the associated power application.

In this manner the controller 62 selectively coordinates operation of the primary limb portions 38,40 and the second chain-link converters 58 to control the configuration of the dPWM voltage waveform at the third terminal 42.

It will be appreciated that the AC voltage waveform generated at the third terminal 42 is shaped to be in the form of other types of dPWM voltage waveforms.

Hence, the first voltage source converter 30 is able to carry out a power transfer function in which the primary limb portions 38,40 provide a primary current path for the transfer of power between the AC and DC electrical networks 46,44 while the secondary limb portions 52,54, by way of its control of the configuration of the dPWM voltage waveform at the third terminal 42, supports the switching of each primary limb portion 38,40 into and out of circuit between the third terminal 42 and the respective DC terminal 32,34.

The control of the configuration of the dPWM voltage waveform at the third terminal 42 provides control over the voltage experienced by each primary limb portion 38,40 and thereby reduces the risk of damage caused by voltage levels exceeding the voltage ratings of the primary limb portions 38,40. As such it is more straightforward to design and optimise the first voltage source converter 30 because the primary limb portions 38,40 can be configured without having to consider the possibility of voltage levels exceeding the voltage ratings of the primary limb portions 38,40.

The use of the second chain-link converters 58 to control the rate of change of voltage at the third terminal 42 prevents the voltage at the third terminal 42 from ramping too quickly between different voltage levels. Using the second chain-link converters 58 to control the ramp of the voltage between different voltage levels thereby minimises or avoids the occurrence of fast fronted and high voltage spikes that may otherwise damage or degrade components or their insulation.

The provision of the star-delta transformer to interconnect the first voltage source converter 30 and the AC electrical network 46 enables removal of the zero sequence component from the dPWM voltage waveform before it is presented to the AC electrical network 46. This thereby reduces the AC filtering requirements of the first voltage source converter 30. It will be appreciated that the transformer may be omitted such that the first voltage source converter 30 is directly connected to the AC electrical network 46, preferably with a DC filter connected at the DC side of the first voltage source converter 30.

It is envisaged that, in other embodiments of the invention, the star-delta transformer may be replaced by another type of transformer that is configured to be capable of removing the zero sequence component from the dPWM voltage waveform before it is presented to the AC electrical network.

Simulation of the operation of the first voltage source converter 30 to generate the dPWM voltage waveform 200, as shown in FIG. 4, shows that the corresponding current waveform 202 has a relatively low THD of approximately 0.07%, after cancellation of the zero sequence component from the dPWM voltage waveform 200. In comparison, the THD of a current waveform corresponding to a trapezoidal voltage waveform is approximately 3%.

The provision of the controller 62 in the first voltage source converter 30 therefore enables the first voltage source converter 30 to generate a dPWM voltage waveform, thus resulting in a lower THD of the corresponding current waveform when compared to the THD of a current waveform corresponding to a trapezoidal voltage waveform. A low THD of the corresponding current waveform removes the need for costly and bulky filtering equipment to meet grid code requirements. This not only reduces the overall cost, size and footprint of the first voltage source converter 30, but also eliminates the occurrence of power losses resulting from operation of the filtering equipment, thus improving the efficiency of the first voltage source converter 30. Moreover the need for a dedicated and sophisticated control system for controlling such filtering equipment is obviated, thus simplifying the overall control of the first voltage source converter 30.

Configuration of the first voltage source converter 30 to include the second chain-link converters 58 enables reduction of the overall losses incurred during transfer of power between the AC and DC electrical networks 46,44.

Figure 1A:
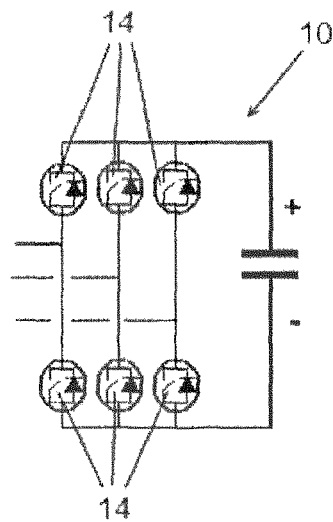
FIGS. 1a, 1b and 1c show, in schematic form, prior art voltage source converters.
Figure 1B:
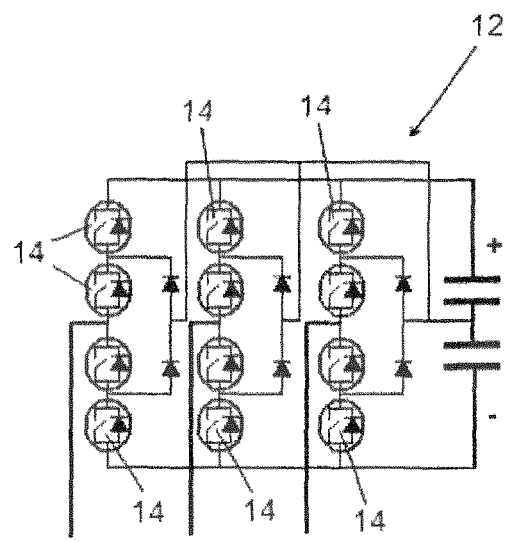
Figure 1C:
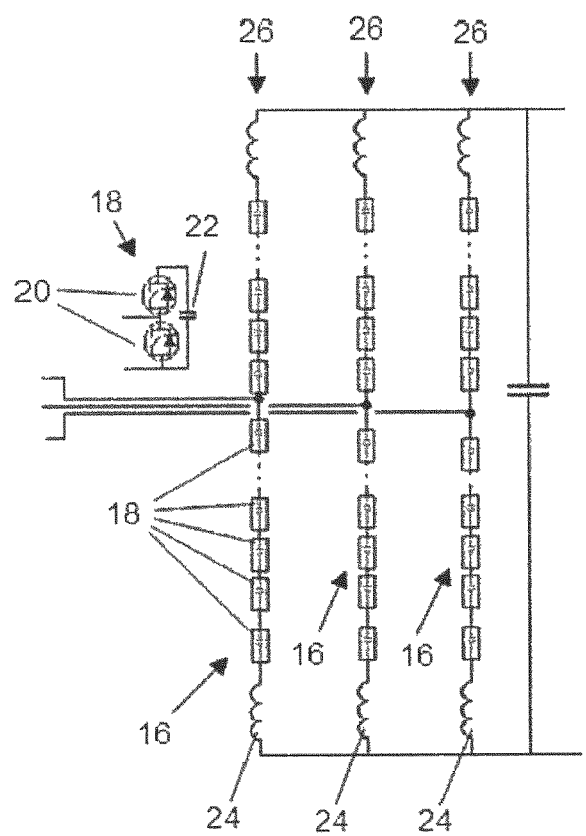

Firstly, during the operation of the first voltage source converter 30, power is divided between the primary and secondary converter limbs 36a,36b over each power cycle. By using switching elements with low conduction losses in the primary limb portions 38,40, the overall conduction losses in the first voltage source converter 30 can be reduced in comparison to a conventional voltage source converter having the same number of converter limbs, each converter limb including a plurality of chain-link modules, an example of which is shown in FIG. 1c. This provides further savings in terms of the cost, size and footprint of the first voltage source converter 30.

Secondly, the presence of each unmodulated period in the dPWM voltage waveform generated at the third terminal 42 decreases the period of active operation of the second chain-link converters 58, thus obviating the need for each second chain-link converter 58 to be in constant active operation during the transfer of power between the AC and DC electrical networks 46,44.

FIG. 5 compares, in graph form, the positive portion of the dPWM voltage waveform generated by the first voltage source converter 30 against the positive portion of a trapezoidal voltage waveform.

It can be deduced from FIG. 5 that, for both voltage waveforms, there are no switching losses when one of the primary limb portions 38,40 is switched into circuit between the third terminal 42 and the respective DC terminal 32,34 because, at this stage, both second chain-link converters 58 are not actively operated but are each configured to track a near-zero or zero voltage reference, with a near-zero or zero current flowing through each second chain-link converter 58. However, the conduction time 100 of the primary limb portion 38,40 during generation of the dPWM voltage waveform is reduced compared to the conduction time 100,102,104 of each primary limb portion 38,40 during generation of the trapezoidal voltage waveform. Although generation of the dPWM voltage waveform at the third terminal 42 can result in additional losses due to a reduced conduction time of the primary limb portions 38,40 when compared to generation of the trapezoidal voltage waveform at the third terminal 42, the dPWM voltage waveform has an average voltage level that is lower than that of the trapezoidal voltage waveform and thereby compensates for the above losses resulting from the reduced conduction time of the primary limb portions 38,40.

The provision of the controller 62 and second chain-link converters 58 in the first voltage source converter 30 therefore enables the first voltage source converter 30 to not only transfer high quality power between the AC and DC electrical networks 46,44, but also reduces the required active operation of the second chain-link converters 58 in order to transfer such high quality power, thus reducing the overall losses associated with voltage source conversion.

FIG. 6 illustrates, in graph form, current waveforms 204,206 respectively flowing in the first primary and secondary limb portions 38,52 of the first voltage source converter 30 during its operation to generate the dPWM voltage waveform at the third terminal 42.

It can be seen from FIG. 6 that each unmodulated period 106 of the dPWM voltage waveform is not aligned with the respective peak current 108,110 which arises during generation of the dPWM voltage waveform. This means that the second chain-link converters 58 are in active operation at or near the respective peak current 108,110, thus resulting in higher switching losses of the second chain-link converters 58.

In use, the controller 62 may selectively control switching of the switching elements in each chain-link module 60 of the second chain-link converters 58 to add a phase shift to the zero sequence component of the dPWM voltage waveform and thereby remove a phase difference between a peak current 108,110 which arises during generation of the dPWM voltage waveform and an unmodulated period 106 of the dPWM voltage waveform. The magnitude of the phase shift may be computed from active and reactive power demands.

FIG. 7 illustrates, in graph form, output AC voltage and current waveforms 208,210 of the first voltage source converter 30 during its operation to generate the dPWM voltage waveform 208 to include the additional phase shift.

It can be seen from FIG. 7 that, although the overall shape of the dPWM voltage waveform 208 is altered by the addition of the phase shift, each unmodulated period is unchanged and the alternating current waveform 210 at the third terminal 30 is still sinusoidal.

FIG. 8 illustrates, in graph form, current waveforms 212,214 flowing in the first primary and secondary limb portions 38,52 of the voltage source converter of FIG. 2 during its operation to generate the dPWM voltage waveform to include the additional phase shift;

It can be seen from FIG. 8 that removing the phase difference between a peak current 108,110 which arises during generation of the dPWM voltage waveform and an unmodulated period 106 of the dPWM voltage waveform allows the peak currents 108,110 to be exactly aligned with the unmodulated periods in which the second chain-link converters 58 are not actively operated. This reduces or eliminates losses that would have otherwise resulted from active operation of the second chain-link converters 58 at the respective peak current 108,110, thus reducing the overall losses resulting from active operation of the second chain-link converters 58, but increases the THD of the current waveform corresponding to the dPWM voltage waveform. Simulation of the operation of the first voltage source converter 30 to generate the dPWM voltage waveform with the additional phase shift, as shown in FIG. 7, shows that the current waveform corresponding to the dPWM voltage waveform with the additional phase shift has a low THD of approximately 0.2%, after cancellation of the zero sequence component from the dPWM voltage waveform.

In use, the controller 62 may selectively control switching of the switching elements in each chain-link module 60 of the second chain-link converters 58 to add a phase shift to the zero sequence component of the dPWM voltage waveform and thereby decrease the phase difference between a peak current which arises during generation of the dPWM voltage waveform and an unmodulated period of the dPWM voltage waveform. This allows the peak currents to be more closely aligned, instead of exactly aligned, with the unmodulated periods in which the second chain-link converters 58 are not actively operated.

The ability to add a phase shift to a zero sequence component of the dPWM voltage waveform therefore enables optimisation of the dPWM voltage waveform to modify the losses resulting from active operation of the second chain-link converters 58 to comply with specific requirements of the associated power application.

A second voltage source converter 130 according to a second embodiment of the invention is shown in FIG. 9. The second voltage source converter 130 of FIG. 9 is similar in structure and operation to the first voltage source converter 30 of FIG. 2, and like features share the same reference numerals.

The second voltage source converter 130 differs from the first voltage source converter 30 in that:
  the second voltage source converter 130 omits the secondary converter limbs 36*b*;
  the second voltage source converter 130 omits each connection between each third terminal 42 and the respective junction 56;
  the second voltage source converter 130 includes a plurality of first secondary limb portions 152 and a plurality of second secondary limb portions 154.

Each secondary limb portion 152,154 includes a second chain-link converter 58. Each first secondary limb portion 152 is connected in parallel with a respective one of the first primary limb portions 38, and each second secondary limb portion 154 is connected in parallel with a respective one of the second primary limb portions 40.

The second chain-link converters 58 of the first and second secondary limb portions 152,154 of the second voltage source converter 130 are respectively similar in structure and operation to the second chain-link converters 58 of the first and second secondary limb portions 52,54 of the first voltage source converter 30.

The first primary limb portion 38 and the third terminal 42 is separated by a first primary inductor 64. The second primary limb portion 40 and the third terminal is separated by a second primary inductor 70. The first secondary limb portion 152 further includes a first secondary inductor 68 connected in series with its second chain-link converter 58.

The second secondary limb portion further includes a second secondary inductor 66 connected in series with its second chain-link converter 58.

The inductance value of the first primary inductor 64 is lower than the inductance value of the first secondary inductor 68. The inductance value of the second primary inductor 70 is lower than the inductance value of the second secondary inductor 66.

The configuration of the voltage source converter in this manner results in an inductor arrangement that removes power glitches caused by generation of the dPWM voltage waveform at the third terminal 42, thus enabling smoother transfer of power between the AC and DC electrical networks 46,44.

It is envisaged that, in other embodiments of the invention, the inductance value of the first primary inductor may be higher than the inductance value of the first secondary inductor, and/or the inductance value of the second primary inductor may be higher than the inductance value of the second secondary inductor.

A third voltage source converter 230 according to a third embodiment of the invention is shown in FIG. 10. The third voltage source converter 230 of FIG. 10 is similar in structure and operation to the first voltage source converter 30 of FIG. 2, and like features share the same reference numerals.

The third voltage source converter 230 differs from the first voltage source converter 30 in that:
the third voltage source converter 230 omits the secondary converter limbs 36*b*;
the third voltage source converter 230 omits each connection between each third terminal 42 and the respective junction 56;
the third voltage source converter 230 includes a second chain-link converter 58 connected to the third terminal 42.

The second chain-link converter 58 is connected between the third terminal 42 and a fourth terminal 72 that separates a pair of DC link capacitors, which are connected between the first and second DC terminals 32,34. The fourth terminal 72 is also connected to ground. In other embodiments of the invention, it is envisaged that the second chain-link converter may be directly connected between the third terminal and ground.

The second chain-link converter 58 of the third voltage source converter 230 is similar in structure to each second chain-link converter 58 of the first voltage source converter 30, except that each chain-link module 60 of the second chain-link converter 58 is a 4-quadrant bipolar chain-link module 60 instead of a 2-quadrant unipolar chain-link module 60.

More specifically each chain-link module 60 of the second chain-link converter 58 of the third voltage source converter 230 includes two pairs of switching elements and an energy storage device in the form of a capacitor. In each chain-link module 60, the switching elements are connected in parallel with the capacitor in a full-bridge arrangement to define a 4-quadrant bipolar chain-link module 60 that can provide negative, zero or positive voltage and can conduct current in two directions.

The capacitor of each chain-link module 60 is selectively bypassed or inserted into the second chain-link converter 58 by changing the state of the switching elements. This selectively directs current through the capacitor or causes current to bypass the capacitor, so that each chain-link module 60 provides a negative, zero or positive voltage.

The capacitor of each chain-link module 60 is bypassed when the pairs of switching elements in each chain-link module 60 are configured to form a short circuit in the chain-link module 60, whereby the short circuit bypasses the capacitor. This causes current in the second chain-link converter to pass through the short circuit and bypass the capacitor, and so the chain-link module 60 provides a zero voltage, i.e. the module 60 is configured in a bypassed mode.

The capacitor of each chain-link module 60 is inserted into the second chain-link converter 58 when the pairs of switching elements in each chain-link module 60 are configured to allow the current in the second chain-link converter 58 to flow into and out of the capacitor. The capacitor then charges or discharges its stored energy so as to provide a non-zero voltage, i.e. the chain-link module 60 is configured in a non-bypassed mode. The full-bridge arrangement of the switching elements of each chain-link module 60 permits configuration of the switching elements to cause current to flow into and out of the capacitor in either direction, and so each chain-link module 60 can be configured to provide a negative or positive voltage in the non-bypassed mode.

Operation of the second chain-link converter 58 of the third voltage source converter 230 to control the configuration of the dPWM voltage waveform at the third terminal 42 is similar to the combined operation of the second chain-link converters 58 of the first voltage source converter 30.

A fourth voltage source converter 330 is shown in FIG. 11. The fourth voltage source converter 330 of FIG. 11 is similar in structure and operation to the first voltage source converter 30 of FIG. 2, and like features share the same reference numerals.

The fourth voltage source converter 330 differs from the first voltage source converter 30 in that:
the fourth voltage source converter 330 omits the secondary converter limbs 36*b*;
the fourth voltage source converter 330 omits each connection between each third terminal 42 and the respective junction 56;
each primary limb portion 38,40 of the fourth voltage source converter 330 includes a first chain-link converter 158 in place of the director switch.

The operation of the first chain-link converters 158 of the fourth voltage source converter is similar in operation to the second chain-link converters 58 of the first voltage source converter 30.

The operation of the first chain-link converters 158 of the fourth voltage source converter differs from the operation of the second chain-link converters 58 of the first voltage source converter 30 in that, during a respective unmodulated period of the dPWM voltage waveform, each first chain-link converter 158 tracks a near-zero or zero voltage reference but is configured to conduct a current and thereby switch the respective primary limb portion 38,40 into circuit to connect the third terminal 42 and the respective DC terminal 32,34.

It is envisaged that, in other embodiments of the invention, at least one of the primary limb portions 38,40 may further include a reactor.

It is also envisaged that each primary limb portion of the fourth voltage source converter may include a series connection of the first chain-link converter 158 and the director switch.

It will be appreciated that the topologies of the first, second, third and fourth second voltage source converters 30,130,230,330 are merely chosen to help illustrate the operation of the invention, and that each voltage source converter 30,130,230,330 may be replaced by another voltage source converter with a different topology.

The invention claimed is:

1. A voltage source converter, for interconnecting first and second electrical networks, comprising:
   first and second terminals for connection to the first electrical network;
   a primary converter limb extending between the first and second terminals, the primary converter limb including first and second primary limb portions separated by a third terminal, the third terminal being connectable to the second electrical network, each primary limb portion including at least one switching element, each primary limb portion being operable to be switched into and out of circuit between the third terminal and a respective one of the first and second terminals, each primary limb portion being operable to transfer power between the third terminal and a respective one of the first and second terminals;
   first and second secondary limb portions, each secondary limb portion including a chain-link converter, each of the first and second secondary limb portions being connected in parallel with a respective one of the first and second primary limb portions, the first primary limb portion and the third terminal being separated by a first primary inductor, the second primary limb portion and the third terminal being separated by a second primary inductor, the first secondary limb portion further including a first secondary inductor, the second secondary limb portion further including a second secondary inductor;
   each of the chain-link converters comprising a plurality of chain-link modules, each of the plurality of chain-link modules being operable to selectively provide a voltage source, wherein each of the chain-link converters includes a control unit configured to selectively operate the plurality of chain-link modules to generate a discontinuous pulse width modulation voltage waveform; and
   a controller configured to selectively operate each of the chain-link converters to control the configuration of a discontinuous pulse width modulation voltage waveform at the third terminal, the controller including each of the control units, the controller being configured to selectively control switching of each primary limb portion into circuit between the third terminal and a respective one of the first and second terminals during a respective unmodulated period of the discontinuous pulse width modulation voltage waveform, the controller being configured to selectively coordinate operation of the primary limb portions and each of the chain-link converters to control the configuration of the discontinuous pulse width modulation voltage waveform at the third terminal.

2. The voltage source converter according to claim 1 wherein the inductance value of the first primary inductor is higher or lower than the inductance value of the first secondary inductor, and/or the inductance value of the second primary inductor is higher or lower than the inductance value of the second secondary inductor.

3. The voltage source converter according to claim 1 wherein the controller is configured to operate each of the chain-link converters to control the rate of change of voltage at the third terminal when both primary limb portions are each switched out of circuit between the third terminal and a respective one of the first and second terminals.

4. The voltage source converter according to claim 1 wherein each of the control units is configured to selectively operate the plurality of chain-link modules to add a phase shift to a zero sequence component of the discontinuous pulse width modulation voltage waveform and thereby decrease or remove a phase difference between: a peak current which arises during generation of the discontinuous pulse width modulation voltage waveform; and an unmodulated period of the discontinuous pulse width modulation voltage waveform.

5. The voltage source converter according to claim 1 wherein an unmodulated period of the discontinuous pulse width modulation voltage waveform is less than, greater than or equal to 60 electrical degrees.

6. The voltage source converter according to claim 1 wherein each of the plurality of chain-link modules includes at least one switching element and at least one energy storage device, the or each switching element and the or each energy storage device in each chain-link module combining to selectively provide a voltage source.

* * * * *